(12) United States Patent
Caler et al.

(10) Patent No.: US 8,289,134 B2
(45) Date of Patent: Oct. 16, 2012

(54) SECURITY SYSTEM AND METHOD WITH AUTOMATIC LANGUAGE SELECTION

(75) Inventors: Dennis M Caler, Marion, NY (US); David L Anderson, Rochester, NY (US); Jeffrey M Swan, Rochester, NY (US)

(73) Assignee: Robert Bosch GmbH, Stuttgart (DE)

( * ) Notice: Subject to any disclaimer, the term of this patent is extended or adjusted under 35 U.S.C. 154(b) by 960 days.

(21) Appl. No.: 12/229,559

(22) Filed: Aug. 25, 2008

(65) Prior Publication Data

US 2010/0045460 A1  Feb. 25, 2010

(51) Int. Cl.
| G05B 19/00 | (2006.01) |
| G05B 23/00 | (2006.01) |
| G06F 7/00 | (2006.01) |
| G06F 7/04 | (2006.01) |
| G08B 29/00 | (2006.01) |
| G08C 19/00 | (2006.01) |
| H04B 1/00 | (2006.01) |
| H04B 3/00 | (2006.01) |
| H04Q 1/00 | (2006.01) |
| H04Q 9/00 | (2006.01) |
| G09B 21/00 | (2006.01) |
| H04M 11/04 | (2006.01) |

(52) U.S. Cl. ............... 340/5.8; 340/4.1; 379/37
(58) Field of Classification Search .......... None
See application file for complete search history.

(56) References Cited

U.S. PATENT DOCUMENTS

| 4,590,604 | A | 5/1986 | Feilchenfeld |
| 5,483,579 | A | 1/1996 | Stogel |
| 5,739,747 | A * | 4/1998 | Flick .................. 340/426.15 |
| 5,959,540 | A | 9/1999 | Walter |
| 6,370,233 | B1 | 4/2002 | Bennett, III |
| 6,421,347 | B1 * | 7/2002 | Borgstahl et al. ........... 370/401 |
| 6,421,453 | B1 * | 7/2002 | Kanevsky et al. ........... 382/115 |
| 6,661,340 | B1 * | 12/2003 | Saylor et al. ............... 340/517 |
| 6,711,543 | B2 * | 3/2004 | Cameron .................... 704/270 |
| 7,068,994 | B2 * | 6/2006 | Van Camp ................ 455/404.2 |
| 7,298,253 | B2 | 11/2007 | Petricoin et al. |
| 7,492,255 | B1 * | 2/2009 | Morris ...................... 340/541 |
| 2002/0054673 | A1 | 5/2002 | Bennett, III et al. |
| 2002/0063632 | A1 * | 5/2002 | Bowman et al. ......... 340/825.19 |
| 2003/0046083 | A1 | 3/2003 | Devinney, Jr. et al. |
| 2003/0151507 | A1 * | 8/2003 | Andre et al. ............ 340/539.13 |
| 2003/0229492 | A1 | 12/2003 | Nolan |
| 2004/0047458 | A1 * | 3/2004 | Elliot et al. ............. 379/142.07 |
| 2004/0085195 | A1 | 5/2004 | McKibbon |
| 2004/0123146 | A1 | 6/2004 | Himmel et al. |
| 2004/0168069 | A1 | 8/2004 | Knight |
| 2006/0227001 | A1 | 10/2006 | Petricoin et al. |
| 2007/0121800 | A1 * | 5/2007 | Rodkey et al. ................ 379/37 |
| 2008/0209034 | A1 * | 8/2008 | Shin et al. .................. 709/224 |
| 2010/0017746 | A1 * | 1/2010 | Husoy et al. ................. 715/781 |

* cited by examiner

*Primary Examiner* — Daniel Wu
*Assistant Examiner* — Emily C Terrell
(74) *Attorney, Agent, or Firm* — Faegre Baker Daniels LLP (57) ABSTRACT

A security system and method of operation thereof are provided in which users of the security system are each assigned a preferred language. A user interface of the security system communicates information to particular users in their assigned preferred languages.

22 Claims, 5 Drawing Sheets

SECURITY SYSTEM AND METHOD WITH AUTOMATIC LANGUAGE SELECTION

FIELD OF THE INVENTION

The present invention relates to surveillance systems that issue alarm signals. More particularly, the present invention relates to improving user interaction with surveillance systems and reducing the issuance of false alarm signals by surveillance systems.

BACKGROUND AND SUMMARY OF THE INVENTION

Surveillance systems, also known as security systems, may include security devices such as motion detectors or cameras for monitoring interior portions of a secured area of space, door sensors and window sensors for monitoring perimeter portions of the secured area of space, or other suitable types of sensors. When one of these sensors detects motion and/or the opening of a monitored door or window, the security system may issue an alarm signal that causes a siren to produce an audible alarm. The alarm signal may also be electronically communicated to a security company. The security company typically notifies the police, who may then visit the secured area of space in order to investigate.

A problem is that many of the alarm signals issued by a security system are what are known as "false alarms". False alarms are not the result of a genuinely dangerous condition, such as the presence of an intruder, but rather are a result of a resident, employee of the building, or other user moving within the secured area of space and inadvertently causing an alarm signal to be issued. Even if there is some time period provided by the security system to allow the user to enter a passcode to thereby abort an alarm signal, the user may not know, or may have forgotten, that the alarm system has been activated. Therefore, the user will not enter a passcode in time to prevent the occurrence of a false alarm. Often, the security system communicates with the user to prompt the user to abort the alarm signal. However, the user may also not be able to understand such communications from the security system which are not in the user's native language. Investigations of the false alarms by the police are a waste of community resources and may result in the owners of the security system being monetarily fined.

An approach to reducing the false alarm problem is known as "entry delay", in which some time period is provided by the security system to allow the user to enter a passcode or other identification to thereby abort an alarm signal, as mentioned above. Most security systems employ an entry delay period which begins when the initial entry door is violated. The user needs to disarm the system within a programmed time period in order to avoid a false alarm. That is, if the system is not disarmed within the given time period, an alarm response will begin.

Another approach is known as "dialer delay", which delays the sending of an alarm signal to a monitoring station for a predetermined time period. This gives the user time to cancel the alarm before emergency service personnel are dispatched. The delay period typically begins when an alarm condition has been detected. The security system will delay the sending of an alarm signal to the central station for a programmed period of time. If the alarm condition is not acknowledged within the given time period, the security system will send a report to a central station.

A problem with both the entry delay and the dialer delay approach is that the user, such as an employee in a secured building, may not be aware that an alarm response is forthcoming, and that he needs to enter a passcode or take some other measure to prevent the alarm. A reason the user may be unaware of the forthcoming alarm response is that he does not understand communications from the security system that he needs to take action in order to avoid the alarm. What is needed in the art is a security system, and method of operation thereof, that communicates with users in their native language or other preferred language, so that each user understands instructions or other communications provided by the security system.

Conventional security products are localized and provide a single language user interface to an end user. Therefore, multiple, separate localized products would be required in order to cover multiple languages. Multiple user interfaces (such as keypads), or other systems, would also be required in order to deliver the different languages desired by the different end-users. The present security system simplifies the user interface and system interaction within a security system product. As discussed above, confusing communications between the end user and a user interface device (e.g. keypad) are a problem within the security industry and often lead to false alarms, user confusion, user intimidation, and a general lack of confidence in using such a security system. In many security systems, end users may speak and understand languages other than the language used by their security system.

The present invention provides an automatic language selection system and method which assigns a preferred language to each security system user. Users then have security system information delivered to them in their preferred language. This customized information provides the user with clear, comprehendible, information and allows user to use the security system with reduced concern, confusion, apprehension, and mistakes. In an illustrated embodiment of the present invention, audible, spoken word instructions are provided to the user in the user's native language (or other language preferred by the user), thereby ensuring that the user will comprehend the meaning of the instructions or other communications and what course of action the user should take.

In an illustrated embodiment of the present invention, a method of operating a security system having at least one user interface comprises assigning a preferred language for communicating with each of a plurality of users of the security system. The preferred language is selected from a plurality of different available languages. The method also comprises detecting a particular user's presence adjacent a user interface of the security system, determining the preferred language assigned to the particular user, and communicating information related to the security system to the particular user in the assigned preferred language.

In an exemplary embodiment, the method of operating a security system further comprises sensing a security breach, and providing an indication to the particular user that an alarm signal will be issued in response to the sensing step. The indication is provided in the particular user's preferred language. Illustratively, the indication provided to the particular user may include instructions given in the particular user's preferred language regarding how to abort the alarm signal.

In another illustrated embodiment of the present invention, a method of operating a security system having at least one user interface comprises assigning a user identification to each of a plurality of users of the security system, selecting a preferred language for communicating with each user from a plurality of different available languages, and associating the user identification of each user with the selected preferred language for that user. The method also comprises detecting a particular user's presence adjacent a user interface of the security system, determining the preferred language associated with the particular user, and communicating with the particular user in the associated preferred language.

In yet another illustrated embodiment of the present invention, a security system comprises a plurality of sensors configured to sense security breaches and generate detection signals based thereon, a controller configured to receive the detection signals from the plurality of sensors and selectively generate an alarm signal in response to the detection signals, and a database accessible by the controller. The database stores a user identification for each of a plurality of users of the security system and a preferred language for communicating with each of the plurality of users of the security system. The preferred language is selected from a plurality of different available languages. The security system also comprises a user interface in communication with the controller. The user interface includes an input device configured to receive a user identification to identify a particular user and a communication device configured to communicate with the particular user in the user's preferred language.

Additional features of the present invention will become apparent to those skilled in the art upon consideration of the following detailed description of illustrative embodiments exemplifying the best mode of carrying out the invention as presently perceived.

BRIEF DESCRIPTION OF THE DRAWINGS

The above mentioned and other features and objects of this invention, and the manner of attaining them, will become more apparent and the invention itself will be better understood by reference to the following description of illustrated embodiments of the invention taken in conjunction with the accompanying drawings, wherein.

DETAILED DESCRIPTION OF THE DRAWINGS

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected" and/or "coupled" are used broadly and encompass both direct and indirect mounting, connecting, and coupling.

Figure 1:
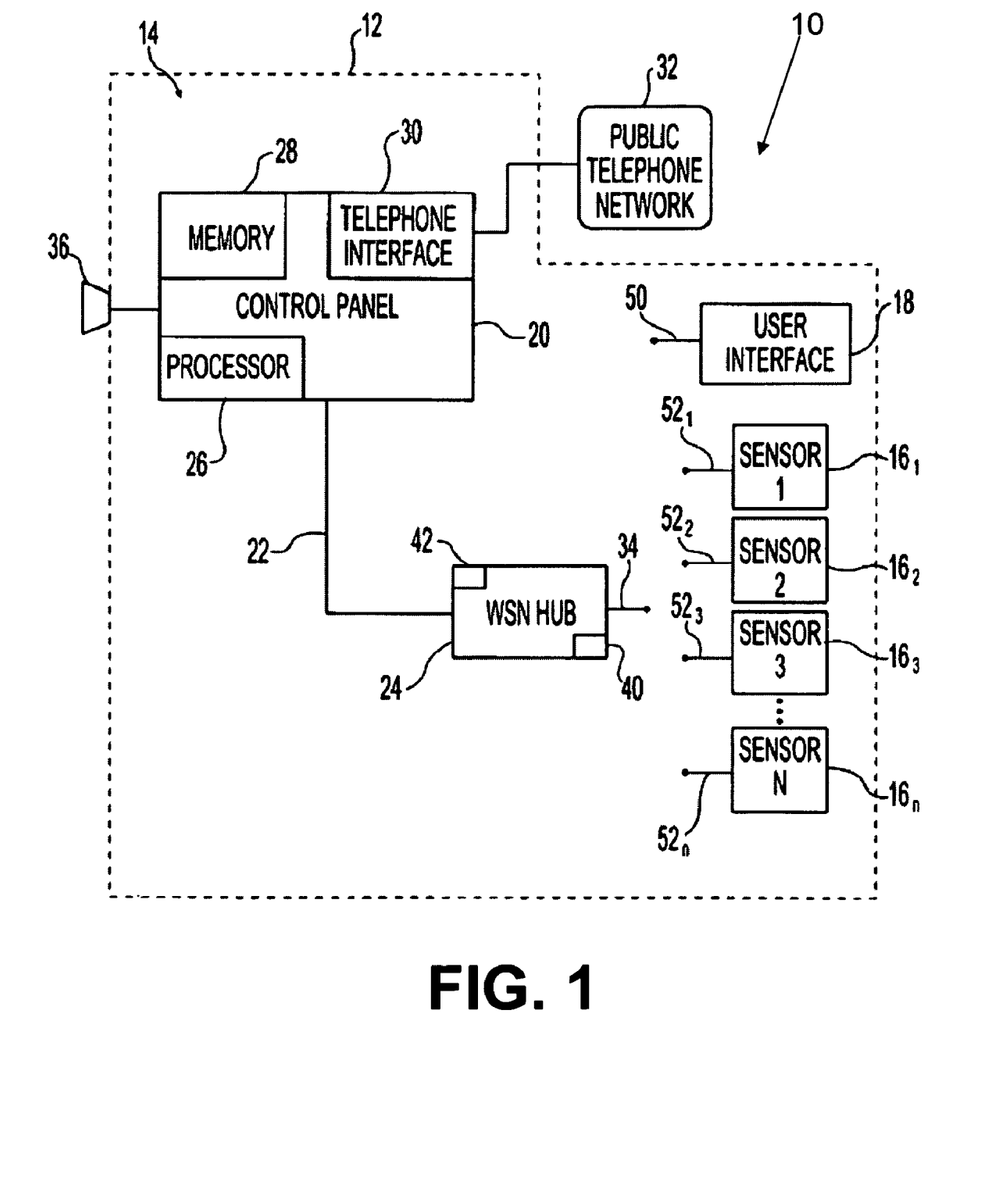
FIG. 1 is a block diagram of one embodiment of a security system of the present invention.

Referring now to the drawings, FIG. 1 illustrates one embodiment of a security system 10 of the present invention for a structure 12 such as a building. However, system 10 may be used to secure other spaces, such as outdoor areas, subterranean rooms and passages, and zones of air space. System 10 includes a system controller 14, security sensors $16_1$ through $16_n$, and at least one user interface 18. Multiple user interfaces 18 may be spaced throughout a building 12, if desired.

System controller 14 includes a control device in the form of a control panel 20 which may be electrically connected via a communication bus 22 to a wireless sensor network (WSN) hub 24. Control panel 20 may include a processor 26, a memory device 28 and a telephone or other communication interface 30. Processor 26 may coordinate communication with the various system components including WSN hub 24 and an audible alarm 36 associated with building 12. Memory 28 may include software for interpreting signals from sensor devices 16 and user interface 18, and deciding based thereon whether to initiate an alarm signal from control panel 20. The alarm signal may be used to activate audible alarm 36, or to notify a central station receiver (CSR) (not shown) such as a security company, fire station, or police station, for example, via public telephone network 32 or other communication channel. After control panel 20 initiates an alarm signal, the alarm signal may be transmitted immediately to alarm 36 and/or to the CSR. Alternatively, after control panel 20 initiates an alarm signal, there may be a delay before the alarm signal is transmitted in order to provide the user time to abort the alarm signal transmission by entering a passcode in user interface 18 or by using another suitable user identification device 100 discussed in FIG. 4 below. Memory 28 may also store identification information for sensors 16 such that control panel 20 may determine by analyzing a received signal which of sensors 16 transmitted the signal.

WSN hub 24 may include an antenna element 34 for transmitting and receiving air-borne signals, such as radio frequency signals. The radio frequency signals may be received by and transmitted from, i.e., exchanged with, sensors 16 and user interface 18. Information from sensors 16 and user interface 18 may be passed by WSN hub 24 to control panel 20 via bus 22. Control panel 20 may pass information to WSN hub 24 via bus 22 for transmission to sensors 16 and user interface 18 as necessary. WSN hub 24 may include a processor 40 and memory 42 for storing software and identification information associated with sensors 16 and user interface 18.

Sensors 16 may be in the form of any number or combination of perimeter sensors, such as window sensors and/or door sensors, and interior sensors, such as motion detectors and/or cameras. The window sensors may detect the opening and/or closing of a corresponding window (not shown) of building 12. The door sensors may detect the opening and/or closing of a corresponding door (not shown) of building 12. Door sensors are traditionally treated as "delay" sensors in that, after the door sensor detects that the corresponding door has been opened, there is a delay before the alarm signal is transmitted in order to provide the user time to abort the alarm signal transmission by entering a passcode in user interface 18 or using another suitable identification device 100. Conversely, window sensors are traditionally treated as "instant" sensors in that, after the window sensor detects that the corresponding window has been opened, the alarm signal is transmitted immediately. However, it is also possible within the scope of the present invention for window sensors to be treated as "delay" sensors. The motion sensors or cameras may each detect movement within a corresponding interior zone of the secured area, and are traditionally treated as "instant" sensors. However, again, it is possible for motion sensors and/or cameras to be treated as "delay" sensors.

Each sensor 16 may be wireless and may include a respective antenna element 52 for transmitting and receiving air-borne signals, such as radio frequency signals. The radio frequency signals may be received by and transmitted from, i.e., exchanged with, WSN hub 24. For example, each sensor 16 may send a detection signal to control panel 20 via hub 24 each time the sensor senses a security breach.

Figure 4:
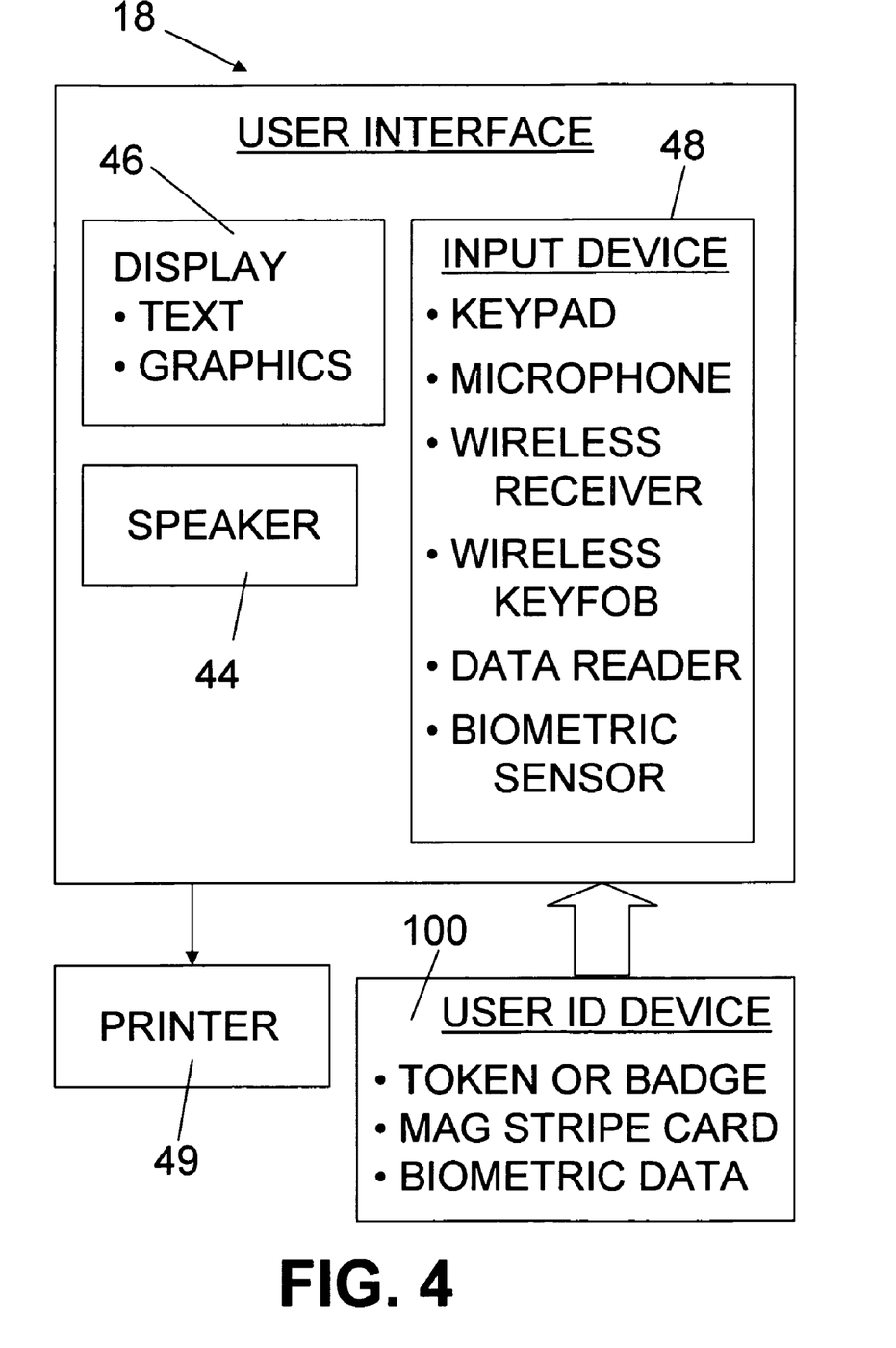
FIG. 4 is a block diagram illustrating components of a user interface and a user identification device in accordance with an illustrated embodiment of the present invention.

User interface 18 may be wireless and may include an antenna element 50 for exchanging air-borne signals with WSN hub 24. As shown in FIG. 4, user interface 18 may include a speaker 44, a visual display 46 such as liquid crystal diode (LCD) or other type of display 46, and at least one input device 48, such as a keypad or other input that enables the user to select a mode of operation and otherwise program or enter data to control the security system 10.

Speaker 44 is capable of producing audible tones or audible spoken words that are intended to be heard by a user of security system 10. The content of the audio communications may be transmitted by control panel 20 to user interface 18 for broadcast by speaker 44. The content may also be generated locally at user interface 18.

As discussed above, when an alarm is triggered there may be a delay period to permit a user to abort the alarm. It is to be understood that the delay period may have any duration selected by a system administrator and/or made available by the manufacturer of security system 10. The time duration of the entry delay period may typically be between approximately 20 seconds and approximately 90 seconds.

During the entry delay period, indicating devices including siren 36, speaker 44, display 46 and printer 49 may provide indications to the user that an alarm signal will be issued in response to a detection signal from one or more of sensors 16. Siren 36 may be loud enough to be easily heard by a user regardless of where he is located on the premises, either inside building 12 or outside building 12. Thus, even if the user is too far away from user interface 18 to see display 46 or to hear the tone from speaker 44, the sound pulse from siren 36 will capture the user's attention.

With the user's attention captured, user interface 18 may audibly provide spoken word information to the user in the user's native or preferred language to explain the significance of the audible siren pulse. The spoken word information may also direct the user as to what actions he should take. This spoken word information in the user's preferred language may be helpful in avoiding false alarms in situations in which the user is confused, only vaguely familiar with the security system, or in a state of mind that does not enable him to comprehend that he must enter his passcode or other identification device 100 to abort the alarm. For example, a spoken word announcement from speaker 44 may state, "To turn off your system, present your token or enter your passcode" in the user's preferred language.

The security system and method of the present invention uses automatic language selection to assign a preferred language to each user of the security system. In an illustrative embodiment, the preferred language for each particular user may be assigned during a user enrollment process as illustrated at block 60 of FIG. 2. During the enrollment process, information related to the user is entered as illustrated at block 62. The user information can be entered via the control panel 20, an input device 18 or a central server at a remote location. The central server may be accessible from any remote computer via a communication network such as the Internet.

Figure 2:
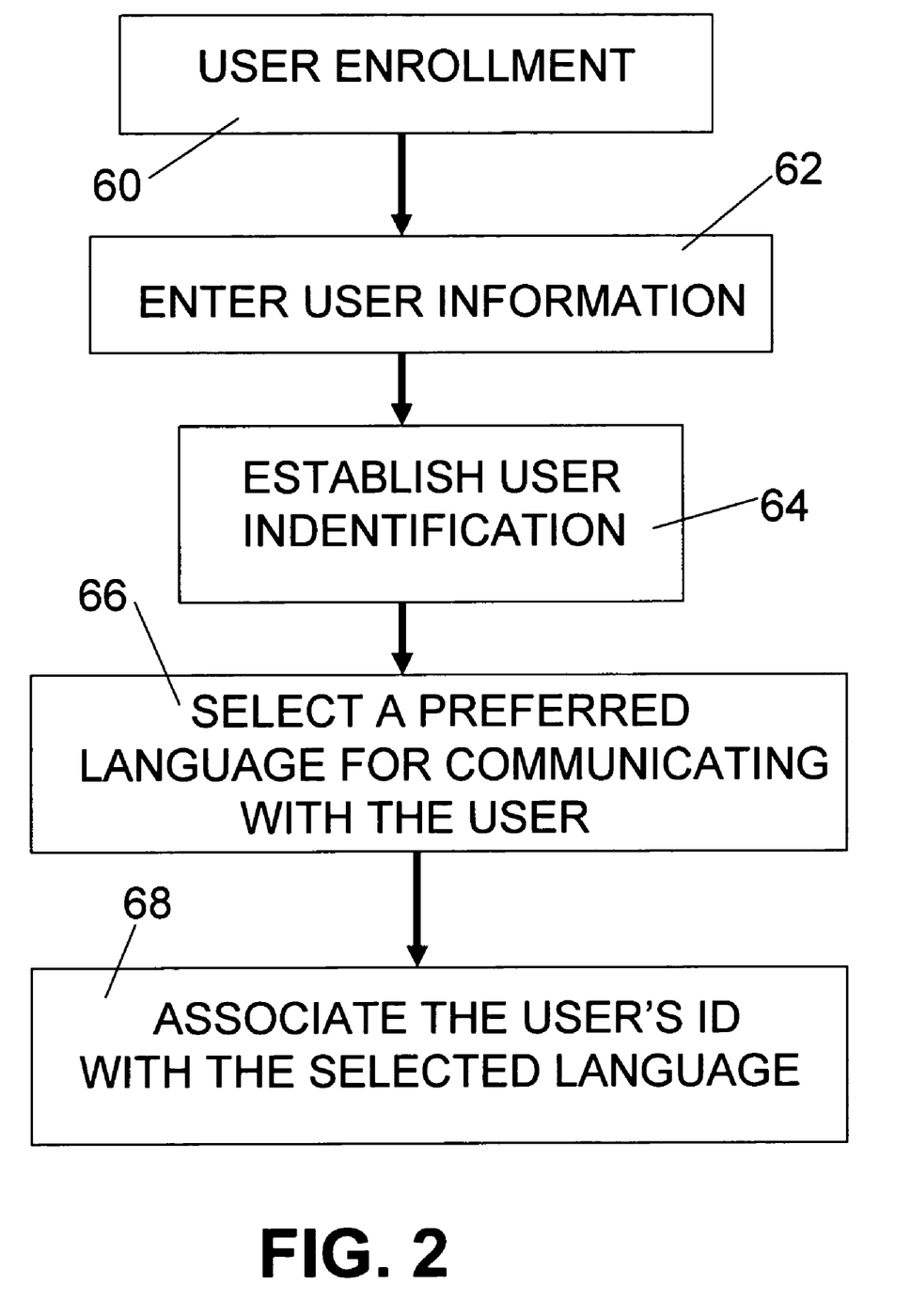
FIG. 2 is a block diagram illustrating an enrollment process for users of the security system.

Next, a user identification is established for each particular user as illustrated at block 64. For instance, the user identification may be an identification number associated with the particular user. Next, the user or operator selects a preferred language for communicating with the user as illustrated at block 66. The language may be selected from a menu of all available languages or may be entered via any other suitable input mechanism. In the illustrated embodiment, the processor 26 associates the user's identification with the selected preferred language as illustrated at block 68. The user information, user identification, and associated preferred language for communicating with the user may be stored in memory 28, in a memory of user interface 18, or in a memory of a server at a remote location.

Figure 3:
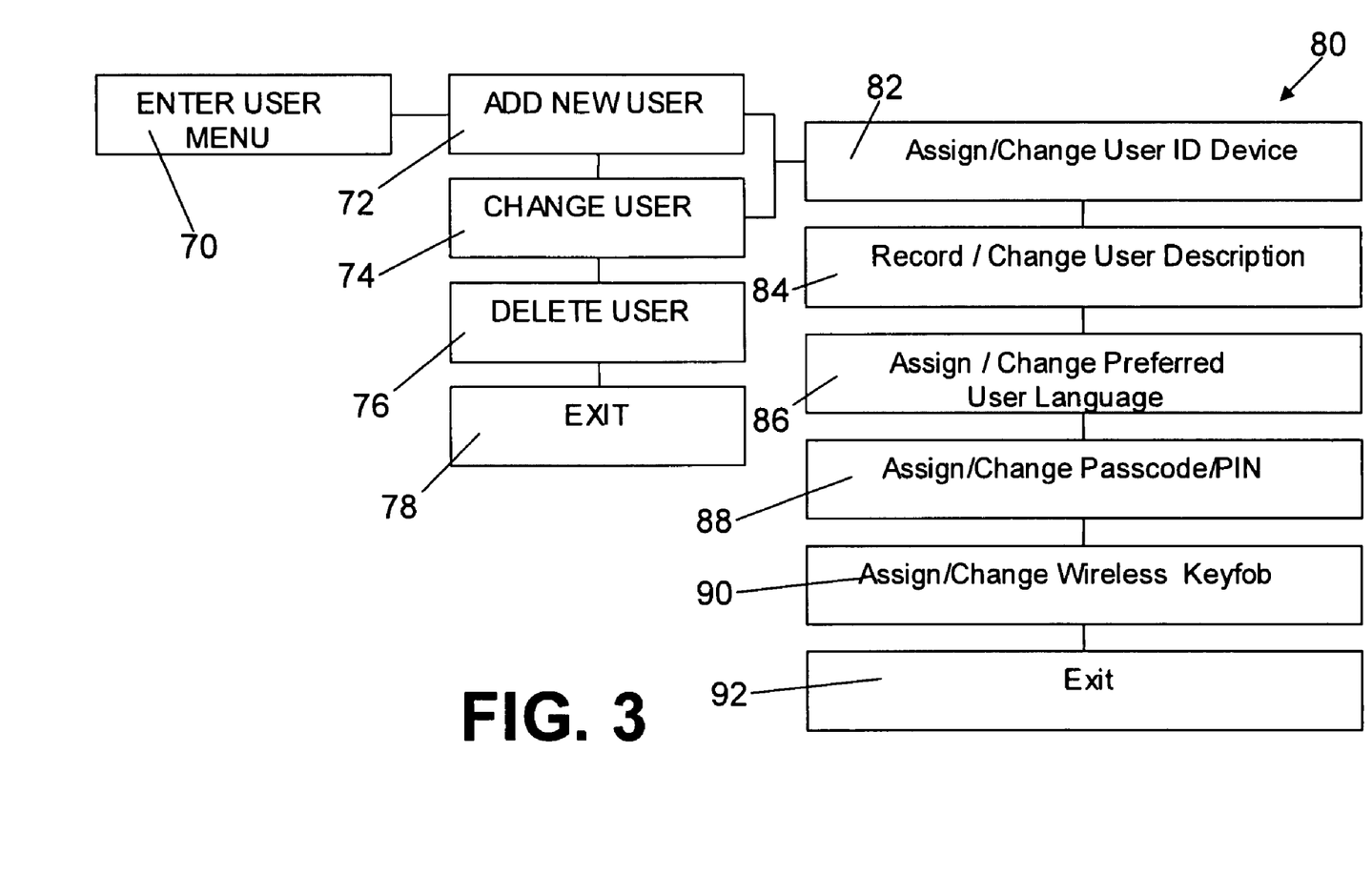
FIG. 3 is a block diagram of an exemplary menu for updating user information in the security system.

FIG. 3 illustrates one embodiment of a user enrollment menu 70 which may be presented to an operator at the control panel 20, user interface 18 or remote server. The user enrollment menu 70 may illustratively include options to add a new user as illustrated at block 72, change a user as illustrated at block 74, delete a user as illustrated at block 76, or exit as illustrated as block 78. If the system operator selects to add a new user at block 72 or change user information as illustrated at block 74, a further menu 80 may be presented. The system operator may then assign or change the user identification device assigned to the particular user as illustrated at block 82. The operator may record or change a user description or other user information as illustrated block 84. The operator may assign or change the preferred or native language to communicate with the user as illustrated at block 86. The operator may assign or change a passcode or personal identification number (PIN) assigned to the user as illustrated at block 88. The operator may assign or change a wireless keyfob as illustrated at block 90. The operator may exit menu 80 as illustrated at block 92.

Once each user of the security system 10 is enrolled, the system detects user inputs or user identifications received by the system and automatically communicate with the user in the native or other preferred language of the user as discussed herein. FIG. 4 illustrates a user interface 18 in more detail. As discussed above, the user interface 18 includes a speaker 44, a display 46, and an input device 48. In an illustrative embodiment, a printer 49 may also be coupled to the user interface 18. The printer 49 may be used to print information for the user, if necessary, in the user's native or other preferred language. Input device 48 may include a keypad, a microphone, a wireless receiver, a data reader, a biometric sensor or other suitable input as illustrated in FIG. 4.

User interface 18 may communicate with a user identification device 100 also shown in FIG. 4. The user identification device 100 may be any suitable device for identifying the particular user. For instance, user identification device 100 may be an RFID token, a badge having a wireless transmitter (IR or RF), a magnetic stripe card, or biometric data available from the user. For example, biometric data may be a fingerprint, a retina, or other unique identification of the user. When the user uses the user identification device 100 to provide an input into the input device 48, the processor 26 accesses the memory 28 to identify the user based on the user's identification. Processor 26 then determines the native language associated with the particular user. The user interface 18 then communicates with the user in the user's preferred language.

In one illustrated embodiment, an RFID tag, an IR or RF badge, or other identification device may be used to identify the user to the system without the user having to manually input any information into the system. Therefore, as the user is passing an area adjacent the user interface 18, the input device 48 automatically detects the presence of the particular user. For instance, the user may wear a wireless transmitter identification badge which includes the RFID token, an IR or RF transmitter, or other identification device which is automatically detected by a data reader of input device 48. Therefore, the user interface 18 may identify the particular user and begin communicating with the particular user in the user's preferred language even before the authentication data is entered via the keypad or other input device 48.

In another illustrated embodiment, a microphone may detect speech of a particular user. The speech may be analyzed with voice recognition software to detect the language being spoken by the particular user. The user interface 18 may then communicate to the particular user in the language detected by the voice recognition software.

In the most basic configuration, the security system 10 will allow the user to be assigned one of two languages (e.g. English or Spanish). Systems with greater capacities provide a greater selection of available languages. The security system 10 may also be configured for a default language, such as English for example. The default language may be the language that is used whenever system information needs to be conveyed and no user authentication is required.

Figure 5:
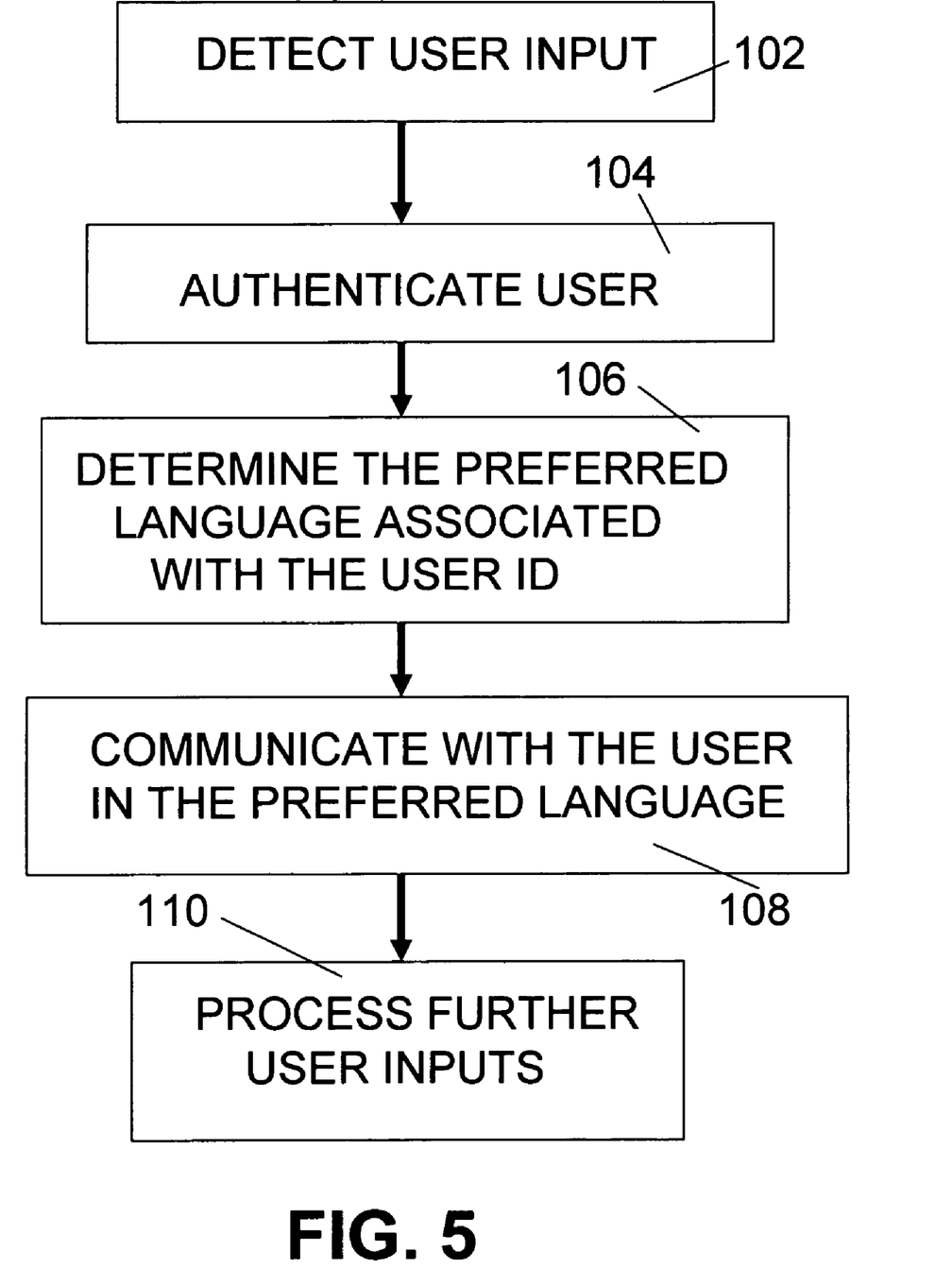
FIG. 5. is a block diagram illustrating steps performed by the security system to communicate with users in their preferred languages.

When a user interacts with the system, the system 10 detects a user input via an input device 48, for example, as illustrated at block 102 of FIG. 5. Next, the user is authenticated as illustrated at block 104. User authentication may include, but is not limited to, the user entering a passcode (PIN) at a user interface/keypad, presenting an RFID token/credential, presenting other credential types (magnetic-stripe card, etc.), pressing a wireless transmitter (keyfob) button, presenting fingerprint, a retina or other biometric data to a reader or scanner, or entering a passcode (PIN) in a telephone menu system. The system 10 then checks its user database to authenticate the user.

After the system authenticates the user at block 104, the system 10 determines the preferred language associated with the particular user as illustrated at block 106. The system 10 then communicates the information to the user in the preferred language that was assigned to that particular user during the enrollment process discussed above as illustrated at block 108. The information may be delivered in the form of a spoken voice, a text display, a graphic display or printed document, all of which are presented in the preferred language of the particular user. Alternative language specific system information may be delivered to end-users that are either physically or mentally handicapped. The system 10 then continues to process further user inputs and communicate with the user in the preferred language as illustrated at block 110.

Illustrated security system user interaction examples are shown below. User 1 has been assigned Spanish as a preferred language, and User 2 has been assigned English as a preferred language:

| User 1 (Spanish) presents RFID token to disarmed system keypad | → System speaks "Preparando la activación de la opción desocupado." to User 1 informing the user that the system is turning on in an unoccupied mode. | → User 1 understands spoken message and leaves the protected premises. |
|---|---|---|
| User 2 (English) presents RFID token to disarmed system keypad | → System speaks "Preparing to activate unoccupied." to User 2 informing them that the system is turning on in an unoccupied mode. | → User 2 understands spoken message and leaves the protected premises. |

The present security system 10 and user interface 18 support multiple languages and specific language-to-user assignments. The system and method therefore improve end user satisfaction and comfort by communicating with users in their native language or other preferred language. Additional results to the owner of the security system are that they can have a single system that will support users that speak and understand different languages. The present illustrated security system solution offers language flexibility in a single system, specifically the language-to-user assignment and the ease of system use that it provides.

While the invention has been illustrated and described in detail in the drawings and foregoing description, the description is to be considered as illustrative and not restrictive in character. Variations and modifications exist within the scope and spirit of the present invention as described and defined herein and in the following claims.

What is claimed is:

1. A method of operating a security system having at least one user interface, the method comprising:
    assigning a user identification to each of a plurality of users of the security system;
    selecting a preferred language for communicating with each user from a plurality of different available languages;
    associating the user identification of each user with the selected preferred language for that user;
    sensing a security breach;
    detecting a particular user's presence adjacent a user interface of the security system;
    determining the preferred language associated with the particular user; and
    providing an indication to the particular user that an alarm signal will be issued in response to sensing the security breach, the indication being provided in the particular user's associated preferred language and including instructions given in the particular user's preferred language regarding how to abort the alarm signal.

2. The method of claim 1, wherein detecting step includes authenticating the particular user as a valid user of the security system.

3. The method of claim 2, wherein the step of authenticating the particular user as a valid user of the security system comprises receiving an input providing the particular user's user identification and comparing the particular user's user identification received to the user identifications assigned during the assigning step.

4. The method of claim 3, wherein the step of receiving an input providing the particular user's user identification comprises at least one of receiving a passcode entered at the user interface, receiving an identification transmission from a wireless transmitter of the particular user, reading a magnetic stripe card, and detecting biometric data of the particular user.

5. The method of claim 1, wherein the instructions are provided to the particular user in the form of a spoken voice in the particular user's preferred language.

6. The method of claim 1, wherein the instructions are provided by displaying information in the particular user's preferred language on a display of the user interface.

7. The method of claim 1, wherein the instructions are provided by printing information in the particular user's preferred language.

8. The method of claim 1, further comprising using voice recognition to detect a language spoken by the particular user and communicating with the particular user in the detected language.

9. The method of claim 1, wherein the detecting step includes determining an identification number associated with the particular user, verifying that the identification number corresponds to a valid user, receiving a passcode from the particular user, and verifying that the passcode is valid.

10. A method of operating a security system having at least one user interface, the method comprising:
- assigning a preferred language for communicating with each of a plurality of users of the security system, the preferred language being selected from a plurality of different available languages;
- sensing a security breach;
- detecting a particular user's presence adjacent a user interface of the security system;
- determining the preferred language assigned to the particular user; and
- providing an indication to the particular user that an alarm signal will be issued in response to sensing the security breach, the indication being provided in the particular user's preferred language and including instructions given in the particular user's preferred language regarding how to abort the alarm signal.

11. A security system comprising:
- a plurality of sensors configured to sense security breaches and generate detection signals based thereon;
- a controller configured to receive the detection signals from the plurality of sensors and selectively generate an alarm signal in response to the detection signals;
- a database accessible by the controller, the database storing a user identification for each of a plurality of users of the security system and a preferred language for communicating with each of the plurality of users of the security system, the preferred language being selected from a plurality of different available languages; and
- a user interface in communication with the controller, the user interface comprising an input device configured to receive a user identification to identify a particular user and a communication device configured to communicate with the particular user in the user's preferred language, and wherein in response to at least one of the sensors sensing a security breach, the communication device provides an indication to the particular user that an alarm signal will be issued, the indication being provided in the particular user's preferred language and including instructions given in the particular user's preferred language regarding how to abort the alarm signal.

12. The system of claim 11, further comprising means for determining the preferred language of the particular based on the user identification received by the input device.

13. The system of claim 11, wherein the input device includes at least one of a keypad, a microphone, a wireless receiver, a data reader, and a biometric sensor.

14. The system of claim 11, wherein the communication device includes at least one of a display, a speaker, and a printer.

15. The system of claim 11, further comprising a user identification device configured to communicate the user identification to the input device of the user interface.

16. The system of claim 15, wherein the user identification device includes at least one of a wireless transmitter, a magnetic stripe card, and biometric data.

17. The system of claim 11, wherein the controller delays the sending the alarm signal to a monitoring station for a predetermined time period in order to give the particular user time to abort the alarm before emergency service personnel are dispatched.

18. The system of claim 11, wherein the controller provides a predetermined time period to allow the user to abort the alarm signal, the controller generating the alarm signal in response to the sensors sensing a security breach if the alarm is not aborted within the predetermined time period.

19. The method of claim 1, further comprising generating the alarm signal in response to the sensing the security breach if the alarm is not aborted within a predetermined time period.

20. The method of claim 1, further delaying sending the alarm signal to a monitoring station for the predetermined time period in order to give the particular user time to abort the alarm before emergency service personnel are dispatched, and sending the alarm signal to the monitoring station in response to the sensing the security breach if the alarm is not aborted within a predetermined time period.

21. The method of claim 10, further comprising generating the alarm signal in response to the sensing the security breach if the alarm is not aborted within a predetermined time period.

22. The method of claim 10, further delaying sending the alarm signal to a monitoring station for a predetermined time period in order to give the particular user time to abort the alarm before emergency service personnel are dispatched, and sending the alarm signal to the monitoring station in response to the sensing the security breach if the alarm is not aborted within a predetermined time period.

* * * * *